US008495519B2

(12) United States Patent
Van Wyk et al.

(10) Patent No.: US 8,495,519 B2
(45) Date of Patent: Jul. 23, 2013

(54) METHODS AND APPARATUS FOR DISPLAYING INTERPROCESS COMMUNICATION THUMBNAILS

(75) Inventors: Adriaan Van Wyk, Strubensvalley (ZA); Natachya Raath, Vandorbijlpark (ZA); Lenz le Roux, Radiokop (ZA); Wynand du Toit, Little Falls (ZA); Olaf Wagner, Issaquah, WA (US); Ben Fourie, Radiokop (ZA); Schalk de Jager, Weltevreden Park (ZA); Pieter Janson, Centruion (ZA)

(73) Assignee: SourceCode Technologies Holdings, Inc., Redmond, MA (US)

( * ) Notice: Subject to any disclaimer, the term of this patent is extended or adjusted under 35 U.S.C. 154(b) by 1389 days.

(21) Appl. No.: 11/945,852

(22) Filed: Nov. 27, 2007

(65) Prior Publication Data

US 2008/0134095 A1 Jun. 5, 2008

Related U.S. Application Data

(60) Provisional application No. 60/939,284, filed on May 21, 2007, provisional application No. 60/867,344, filed on Nov. 27, 2006.

(51) Int. Cl.
*G06F 3/048* (2006.01)

(52) U.S. Cl.
USPC ........................................ 715/838; 715/764

(58) Field of Classification Search
USPC ................................................ 715/764, 838
See application file for complete search history.

(56) References Cited

U.S. PATENT DOCUMENTS

| 5,926,387 | A  | * | 7/1999  | Furst ............................ 700/83 |
|-----------|----|---|---------|------------------------------------------|
| 6,084,585 | A  |   | 7/2000  | Kraft et al.                             |
| 6,507,865 | B1 |   | 1/2003  | Hanson et al.                            |
| 6,694,362 | B1 |   | 2/2004  | Secor et al.                             |
| 6,845,378 | B1 |   | 1/2005  | Pauly et al.                             |
| 6,853,974 | B1 | * | 2/2005  | Akifuji et al. ................... 705/9 |
| 6,957,186 | B1 |   | 10/2005 | Guheen et al.                            |
| 6,970,844 | B1 |   | 11/2005 | Bierenbaum                               |
| 6,978,379 | B1 |   | 12/2005 | Goh et al.                               |
| 7,111,300 | B1 |   | 9/2006  | Salas et al.                             |
| 7,155,720 | B2 |   | 12/2006 | Casati et al.                            |
| 7,184,967 | B1 |   | 2/2007  | Mital et al.                             |
| 2001/0044738 | A1 | | 11/2001 | Elkin et al.                             |
| 2001/0047279 | A1 | | 11/2001 | Gargone                                  |
| 2002/0052769 | A1 | | 5/2002  | Navani et al.                            |
| 2002/0059264 | A1 | | 5/2002  | Fleming et al.                           |
| 2003/0149714 | A1 | | 8/2003  | Casati et al.                            |
| 2003/0197733 | A1 | | 10/2003 | Beauchamp et al.                         |

(Continued)

OTHER PUBLICATIONS

Written Opinion of the International Searching Authority for International Application No. PCT/US06/60470 dated Mar. 3, 2008.

(Continued)

*Primary Examiner* — Matt Kim
*Assistant Examiner* — Andrea Leggett
(74) *Attorney, Agent, or Firm* — K&L Gates LLP

(57) ABSTRACT

The present disclosure provides methods and apparatuses for generating a dynamic, live thumbnail representation of the underlying process. Using the methods and apparatus herein, users can easily understand the functions of a sub-process.

15 Claims, 7 Drawing Sheets

U.S. PATENT DOCUMENTS

| | | | |
|---|---|---|---|
| 2004/0002881 A1 | 1/2004 | Hu et al. | |
| 2004/0199540 A1 | 10/2004 | Nojima | |
| 2004/0221238 A1* | 11/2004 | Cifra et al. | 715/762 |
| 2004/0267897 A1 | 12/2004 | Hill et al. | |
| 2005/0086092 A1 | 4/2005 | Kowalski | |
| 2005/0216282 A1 | 9/2005 | Chen et al. | |
| 2005/0257267 A1 | 11/2005 | Williams et al. | |
| 2006/0122975 A1 | 6/2006 | Taylor et al. | |
| 2006/0184410 A1 | 8/2006 | Ramamurthy et al. | |
| 2006/0190310 A1 | 8/2006 | Gudla et al. | |
| 2007/0058277 A1* | 3/2007 | Kudo et al. | 360/48 |
| 2010/0131289 A1* | 5/2010 | Brandt et al. | 705/2 |

OTHER PUBLICATIONS

Written Opinion of the International Searching Authority for International Application No. PCT/US08/58019 dated Jun. 2, 2008.
Written Opinion of the International Searching Authority for International Application No. PCT/US08/58020 dated Jun. 27, 2008.
Written Opinion of the International Searching Authority for International Application No. PCT/US08/54414 dated Jul. 25, 2008.
Written Opinion of the International Searching Authority for International Application No. PCT/US08/63087 dated Jul. 25, 2008.
Written Opinion of the International Searching Authority for International Application No. PCT/US08/64689 dated Aug. 7, 2008.

* cited by examiner

METHODS AND APPARATUS FOR DISPLAYING INTERPROCESS COMMUNICATION THUMBNAILS

CROSS-REFERENCE TO RELATED APPLICATIONS

The present application claims benefit to U.S. patent application Ser. No. 60/867,344, METHOD AND APPARATUS FOR CREATING WORK FLOW, filed on Nov. 27, 2006; and U.S. patent application Ser. No. 60/939,284, METHODS AND APPARATUS FOR DISPLAYING INTERPROCESS COMMUNICATION THUMBNAILS, filed on May 21, 2007, the entire contents of which are incorporated herein by reference.

BACKGROUND

A business process is a combination of operational steps or activities that a business undertakes. A business may conduct a high number of business processes throughout the course of a day or year, in order to accomplish the business's goals. An operational step or activity may be any action from the mundane to the complex.

Through the use of technology, businesses can now model their business processes in a graphical nature. What used to be a loosely defined set of procedures can now be formalized into complex business process workflows. The formalized business processes allow managers to understand the bottlenecks of a process, and to redesign the business processes for efficiency.

Business can now also incorporate business process design into their existing technology systems. Instead of providing a simple map of a business process, integration with computer systems allows business process designers to design interactive business processes that drive business workflow. Business process designers can receive data from various sources and perform a wide range of actions on the data directly, and create business processes in an easy to understand visual manner.

Businesses create workflows as a part of business process design to assist in managing their internal operations. Business processes allow users to represent the current state of their business operations in a graphical manner. Users can also simulate new business operations through the use of business processes.

Some business process designers use graphical business process design software to create graphical workflows. The graphical software may use graphical objects to represent business processes and workflow activities. The combining of multiple process into a single executable process allows the business process designer to create processes of greater complexity. However, complicated sub-processes within processes are difficult to understand, and business process designers have difficulty remembering the what functions the sub-process is performing.

SUMMARY

The present disclosure provides methods and apparatuses for generating a dynamic, live thumbnail representation of the underlying process. Using the methods and apparatus herein, users can easily understand the functions of a sub-process.

Additional features and advantages are described herein, and will be apparent from, the following Detailed Description and the figures.

DETAILED DESCRIPTION

Figure 1:
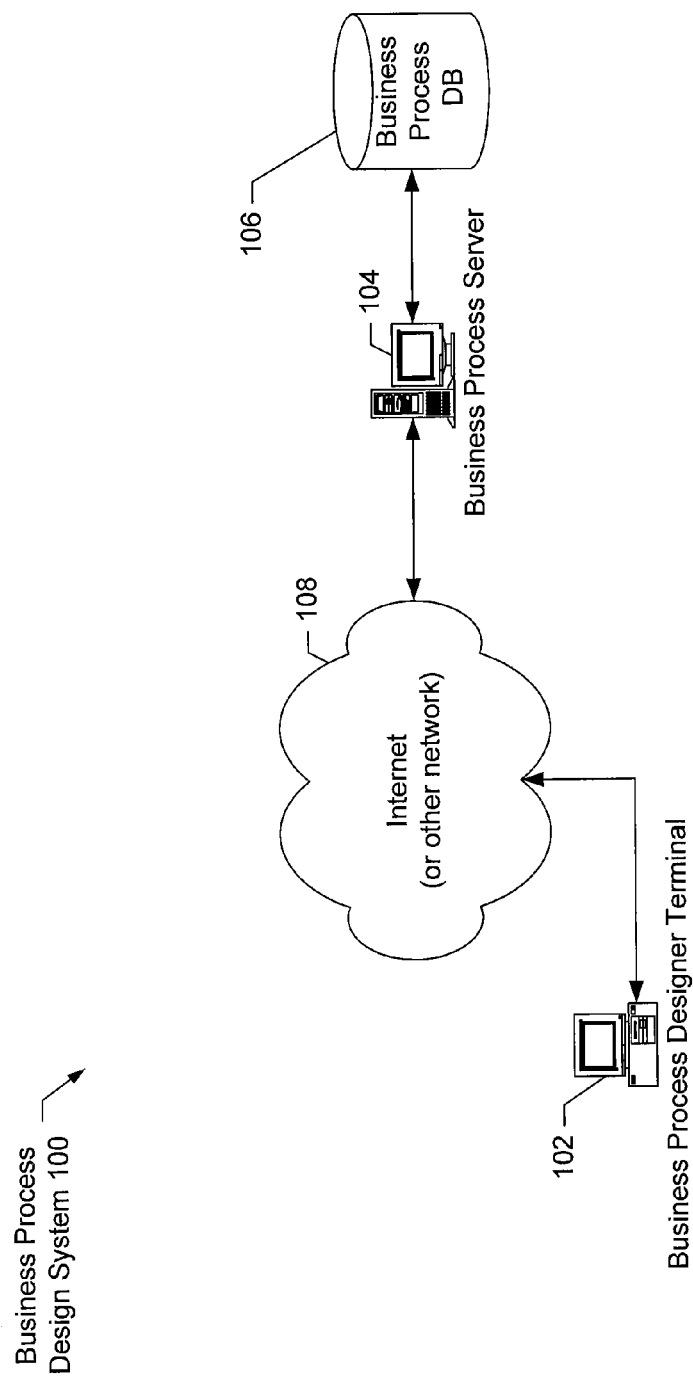
FIG. 1 is a high level block diagram of an example business process design system.

The present system is most readily realized in a network communications system. A high level block diagram of an exemplary network communications system 100 is illustrated in FIG. 1. The illustrated system 100 includes one or more business process designer terminals 102, one or more business process servers 104, and one or more business process databases 106. Each of these devices may communicate with each other via a connection to one or more communications channels 108 such as the Internet or some other data network, including, but not limited to, any suitable wide area network or local area network. It will be appreciated that any of the devices described herein may be directly connected to each other instead of over a network.

The business process server 104 stores a plurality of files, programs, and/or web pages in one or more business process databases 106 for use by the business process designer terminals 102. The business process database 106 may be connected directly to the business process server 104 or via one or more network connections. The business process database 106 preferably stores business process data.

One business process server 104 may interact with a large number of business process designer terminals 102. Accordingly, each business process server 104 is typically a high end computer with a large storage capacity, one or more fast microprocessors, and one or more high speed network connections. Conversely, relative to a typical business process server 104, each business process designer terminal 102 typically includes less storage capacity, a single microprocessor, and a single network connection.

Figure 2:
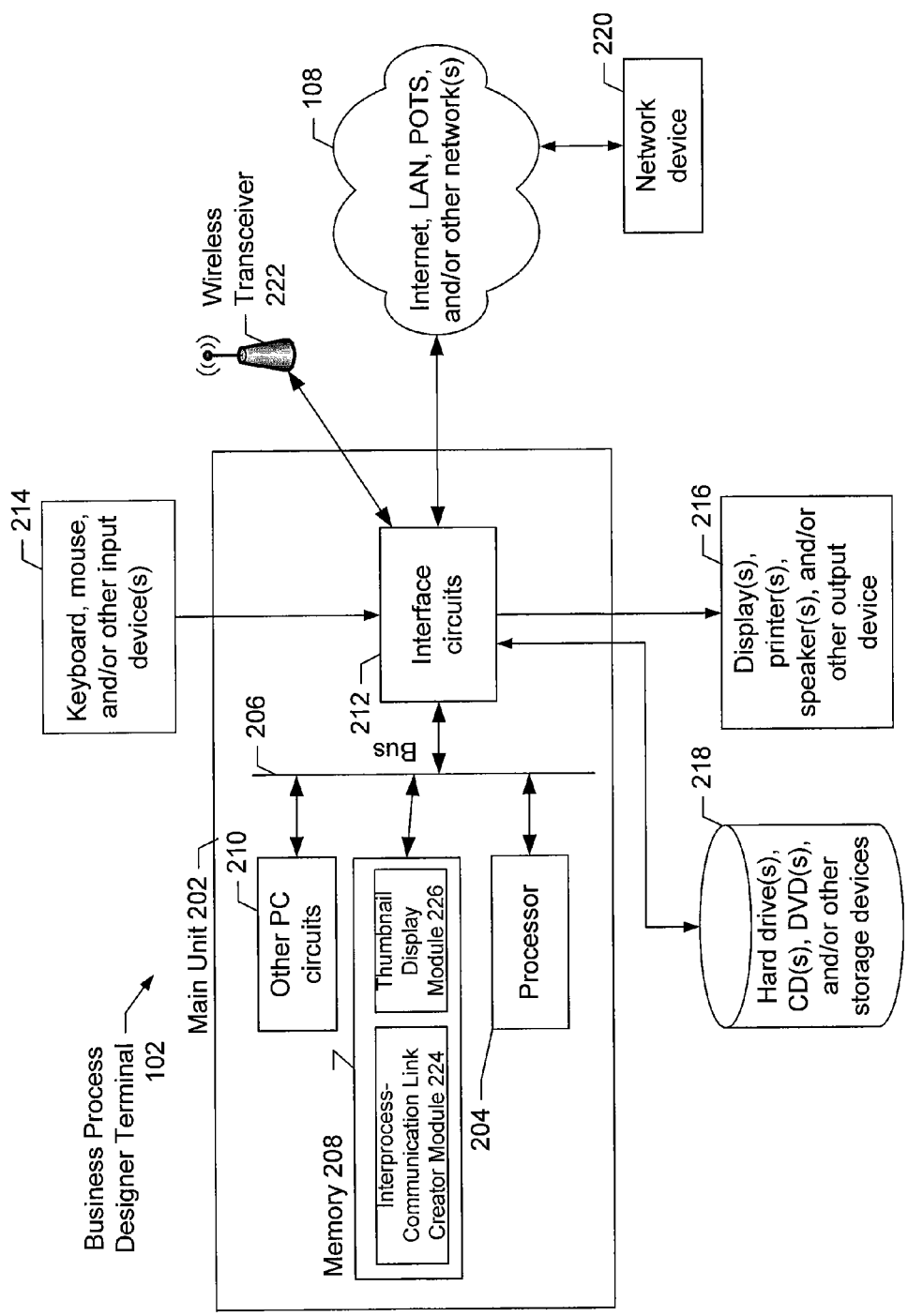
FIG. 2 is a more detailed block diagram showing one example of a client device.

A more detailed block diagram of a business process designer terminal 102 is illustrated in FIG. 2. The business process designer terminal 102 may include a personal computer (PC), a personal digital assistant (PDA), an Internet appliance, a cellular telephone, or any other suitable communication device. The business process designer terminal 102 preferably includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with one or more of the other devices in the system 100 as described below. This program may be executed by the processor 204 in any suitable manner. The memory 208 may also store digital data indicative of documents, files, programs, web pages, etc.

retrieved from one or more of the other devices in the system 100 and/or loaded via an input device 214. Preferably, the memory 208 stores a software program that implements all or part of the method described below.

In particular, the memory 208 preferably stores an interprocess-communication link creator 224 and a thumbnail display module 226. The interprocess-communication link creator module 224 creates a link to a sub-process. For example, the business process designer may utilize an interprocess-communication wizard to create a link to a sub-process as shown in FIGS. 5-9. The interprocess-communication link creator module 224 may link to a sub-process using interprocess communications and allow the business process designer to utilize sub-processes in process design.

The thumbnail display module 226 may be used to create the visual representation of the sub-process on the business process design terminal 102. For example, the thumbnail display module 226 may use vector graphics to create the dynamic thumbnail. The dynamic thumbnail may represent all of the functionality of the full sub-process. The thumbnail may be presented as read-only and not allow changes on the thumbnail directly. However, changes to the underlying sub-process may be reflected in the thumbnail. The thumbnail display module 226 may also receive a request from the business process designer to display the full sub-process. For example, the thumbnail display module 226 may receive an input from the 214, such as a mouse click on the thumbnail, indicating that the business process designer wishes to display a full version of the sub-process. The thumbnail display module 226 will retrieve the full sub-process for display. Any chances made to the sub-process may be represented in the thumbnail dynamically.

These software modules 224 and 226 may be executed by the processor 204 in a conventional manner. However, some of the acts described in the method below may be performed manually or without the use of the business process designer terminal 102. Additionally, the software modules 224 and 226 may be stored in the memory 308 and executed by the processor 304.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the business process designer terminal 102. For example, the display 216 may be used to display web pages received from the business process server 104. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the business process designer terminal 102.

The business process designer terminal 102 may also exchange data with other network devices 220 via a connection to the network 112. The network connection may be any type of network connection, such as an Ethernet connection, digital subscriber line (DSL), telephone line, coaxial cable, etc. Users of a business process designer terminal 102 may be required to register with the business process server 104. In such an instance, each user of a business process designer terminal 102, may choose a user identifier (e.g., e-mail address) and a password which may be required for the activation of services. The user identifier and password may be passed across the network 108 using encryption built into the business process designer terminal 102 browser. Alternatively, the user identifier and/or password may be assigned by the business process server 104.

Figure 3:
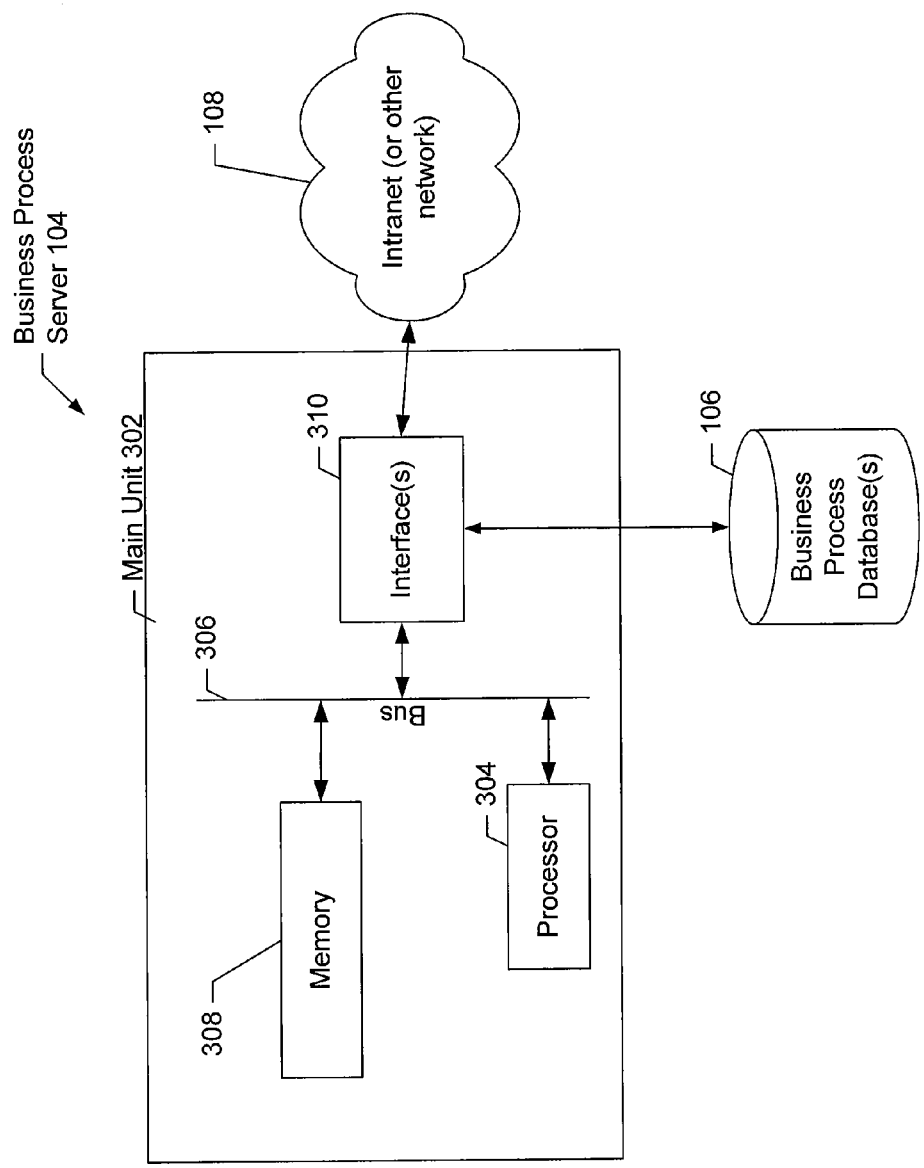
FIG. 3 is a more detailed block diagram showing one example of a server.

A more detailed block diagram of a business process server 104 is illustrated in FIG. 3. Like the business process designer terminal 102, the main unit 302 in the business process server 104 preferably includes one or more processors 304 electrically coupled by an address/data bus 306 to a memory device 308 and a network interface circuit 310. The network interface circuit 310 may be implemented using any suitable data transceiver, such as an Ethernet transceiver. The processor 304 may be any type of suitable processor, and the memory device 308 preferably includes volatile memory and non-volatile memory.

Figure 4:
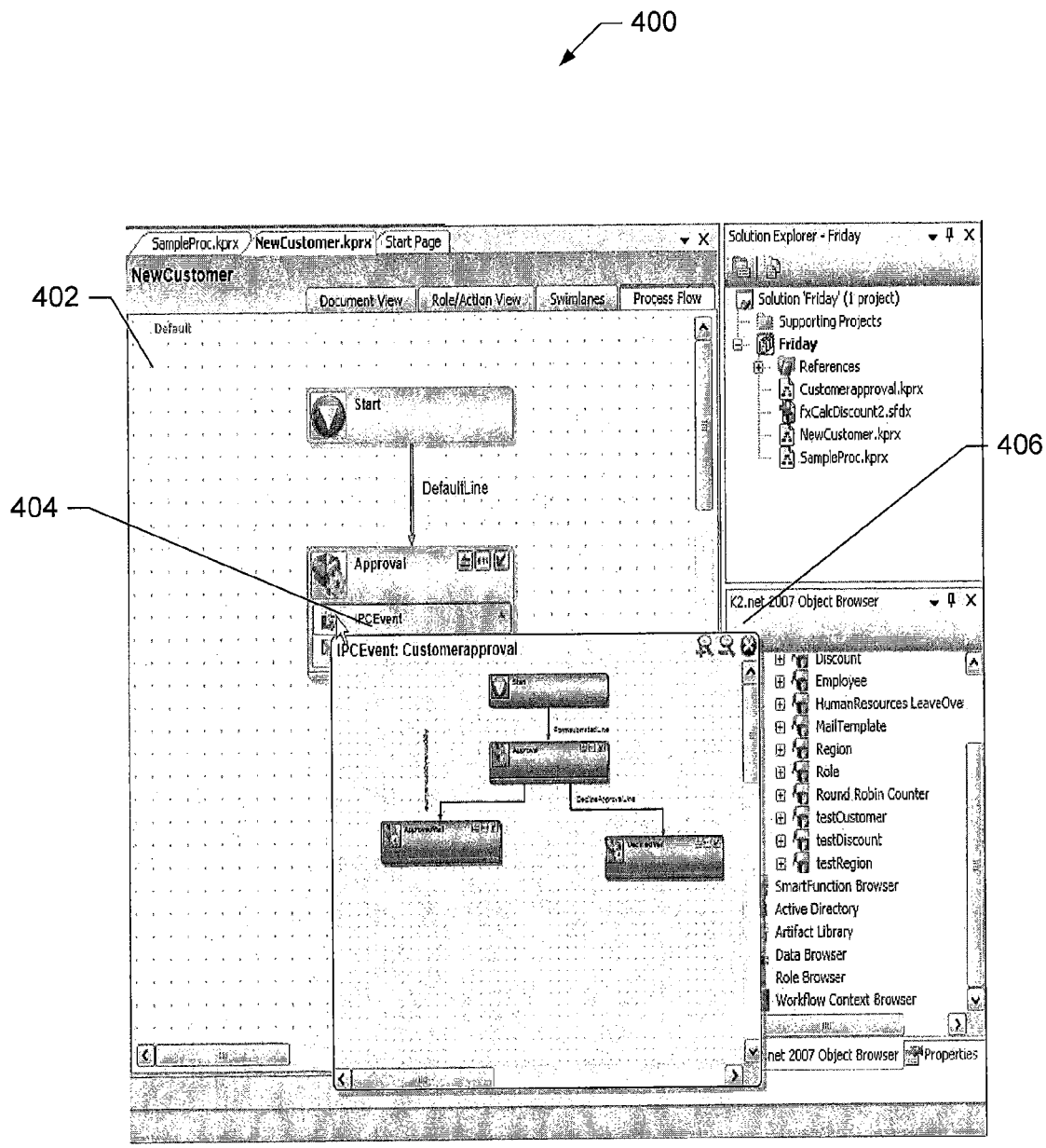
FIG. 4 is an example screenshot of a thumbnail of a sub-process screen.

A screenshot of an example thumbnail of a sub-process 400 is presented in FIG. 4. Although the example thumbnail of a sub-process 400 is described in reference FIG. 4, it will be appreciated that many other configurations are possible. For example, elements could be in different locations, elements could have different names, and elements could have different graphical representations.

A thumbnail of a sub-process screen 400 may have a canvas 402 where the business process designer places process elements. For example, a "Start" point may be present on the canvas. The thumbnail of a sub-process screen 400 may have a sub-process 404. The sub-process 404 may be the result of creating an interprocess-communication link using the interprocess-communication link creator 224. A business process designer that wishes to view the thumbnail of a sub-process may use an input device to indicate the appropriate activity. For example, the business process designer may use a mouse to place a cursor over the sub-process 404. The thumbnail display module 226 may then display a thumbnail 406 of the sub-process 404. The thumbnail 406 may include a representation of the processes and activities that comprise the sub-process 404.

A business process designer may wish to create a link to a sub-process. For example, the business process designer may open an interprocess-communication wizard to create a new link to a sub-process.

Figure 5:
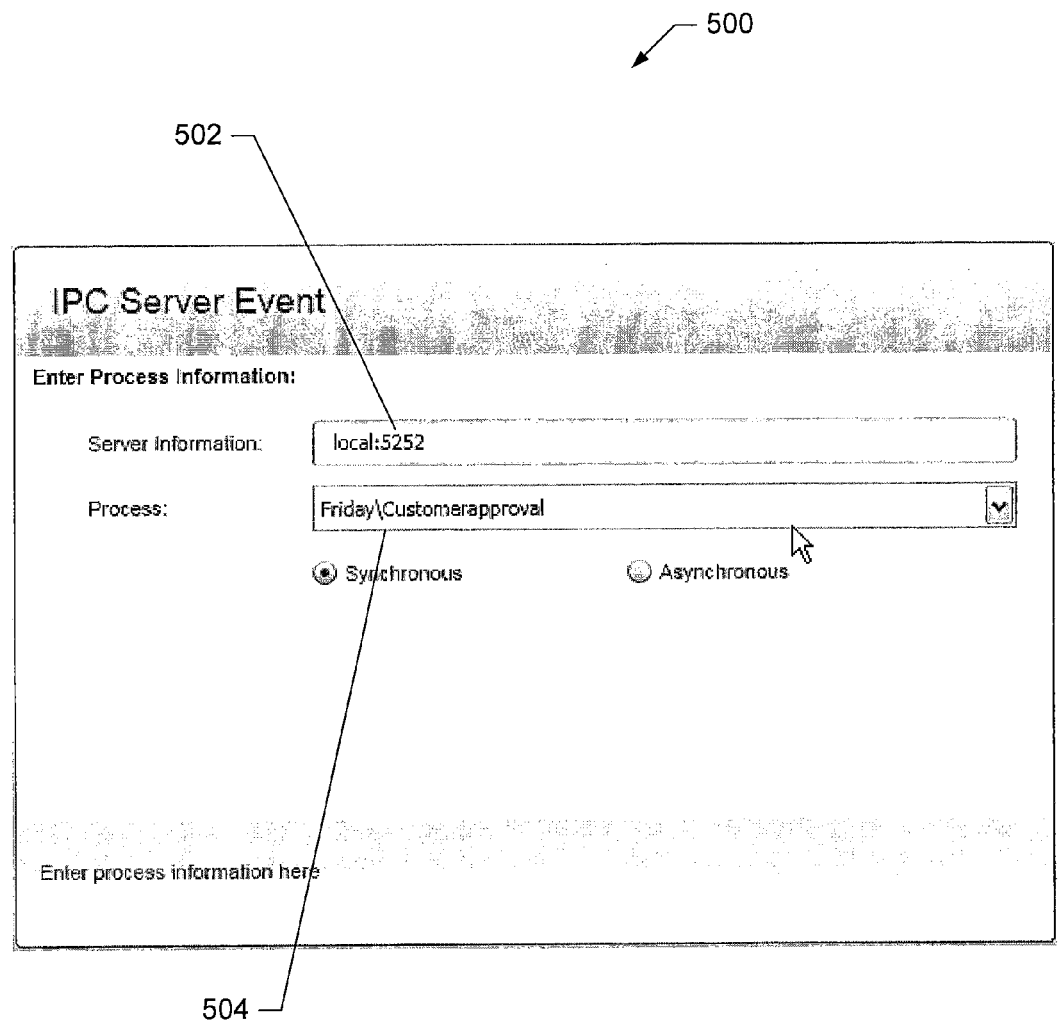
FIG. 5 is an example screenshot of an interprocess-communication process information screen.

The business process designer terminal 102 may then display an interprocess-communication process information screen 500, an example is provided in FIG. 5. The interprocess-communication process information screen 500 may contain inputs for entering information about the process. For example, the interprocess-communication process information screen may include a text box for sever information 502, and a text box for a process name or location 504.

Figure 6:
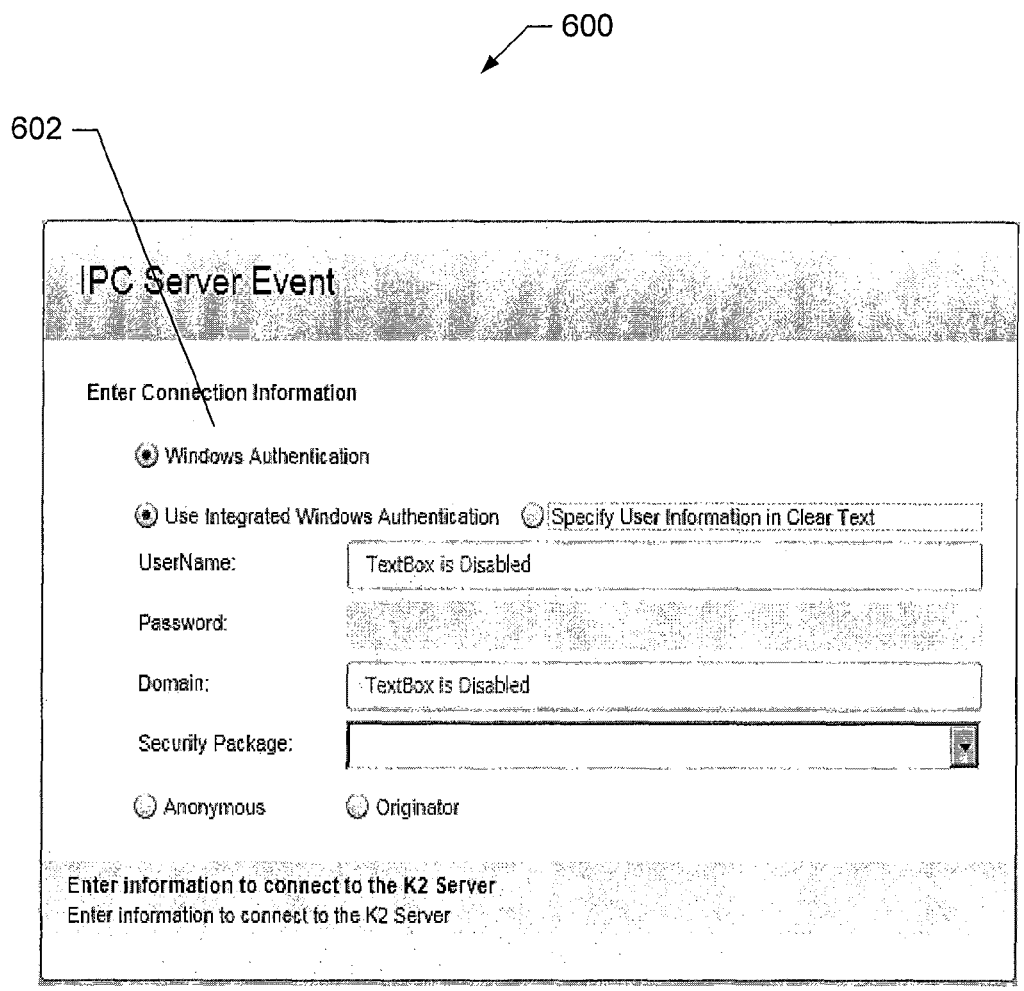
FIG. 6 is an example screenshot of an interprocess-communication connection information screen.

The business process designer terminal 102 may then display an interprocess-communication connection information screen 600, an example is provided in FIG. 6. The interprocess-communication connection information screen 600 may contain entries to enter information regarding the connection to the server. For example, the interprocess-communication connection information screen 602 may contain entries for authentication status, security information, etc.

The business process designer terminal 102 may then display an interprocess-communication data communication

Figure 7:
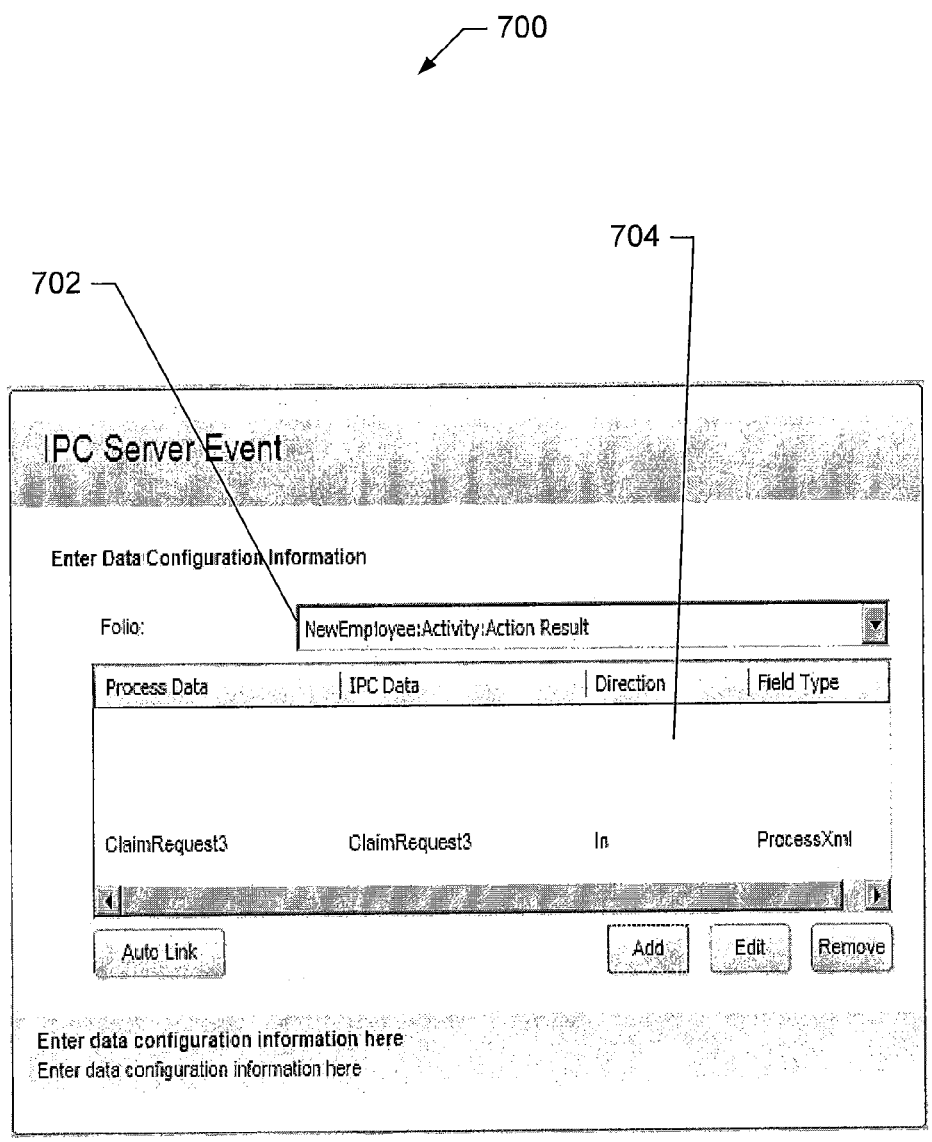
FIG. 7 is an example screenshot of an interprocess-communication data communication screen.

700, an example is provided in FIG. 7. The interprocess-communication data communication 700 may allow the business process designer to enter information regarding the data configuration.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for displaying live interprocess thumbnails comprising:
   storing a first workflow process in a first location;
   creating an interprocess link, where the interprocess link is associated with the first workflow process and includes information about the first location;
   inserting the interprocess link into a second workflow process stored in a second location, wherein the first workflow process becomes a sub-process of the second workflow process as a result of inserting the interprocess link;
   displaying a full representation of the second workflow process;
   receiving a command associated with the interprocess link; and
   displaying a live instantiation of the first workflow process as a live thumbnail representation, in response to the command, inside the second workflow process as a sub-process of the second workflow process.

2. The method of claim 1, including:
   updating the first workflow process; and
   dynamically updating the live thumbnail representation.

3. The method of claim 1, wherein creating the interprocess link includes displaying an interprocess link creation wizard.

4. The method of claim 1, wherein the live thumbnail representation is read-only.

5. The method of claim 1, including displaying the live thumbnail representation using vector graphics.

6. A system for displaying live interprocess thumbnails, the system comprising:
   a processor for:
   (a) storing a first workflow process in a first location;
   (b) creating an interprocess link where the interprocess link is associated with the first workflow process and includes information about the first location; and
   (c) inserting the interprocess link into a second workflow process stored in a second location, wherein the first workflow process becomes a sub-process of the second workflow process as a result of inserting the interprocess link;
   (d) displaying a full representation of the second workflow process;
   (e) receiving a command associated with the interprocess link; and
   (f) displaying a live instantiation of the first workflow process as a live thumbnail representation, in response to the command, inside the second workflow process as a sub-process of the second workflow process.

7. The system of claim 6, the processor additionally for:
   (d) updating the first workflow process; and
   (e) dynamically updating the live thumbnail representation.

8. The system of claim 6, wherein creating the interprocess link includes displaying an interprocess link creation wizard.

9. The system of claim 6, wherein the live thumbnail representation is read-only.

10. The system of claim 6, including displaying the live thumbnail representation using vector graphics.

11. A non-transitory computer readable medium for displaying live interprocess thumbnails storing instructions structured to cause a computing device to:
    store a first workflow process in a first location;
    create an interprocess link where the interprocess link is associated with the first workflow process and includes information about the first location;
    insert the interprocess link into a second workflow process stored in a second location, wherein the first workflow process becomes a sub-process of the second workflow process as a result of inserting the interprocess link;
    display a full representation of the second workflow process; receive a command associated with the interprocess link; and display a live instantiation of the first workflow process as a live thumbnail representation, in response to the command, inside the second workflow process as a sub-process of the second workflow process.

12. The non-transitory computer readable medium of claim 11, wherein the instructions are structured to cause the computing device to:
    update the first workflow process; and
    dynamically update the live thumbnail representation.

13. The non-transitory computer readable medium of claim 11, wherein creating the interprocess link includes displaying an interprocess link creation wizard.

14. The non-transitory computer readable medium of claim 11, wherein the live thumbnail representation is read-only.

15. The non-transitory computer readable medium of claim 11, wherein the instructions are structured to cause the computing device to display the live thumbnail representation using vector graphics.

* * * * *